Figure 1:
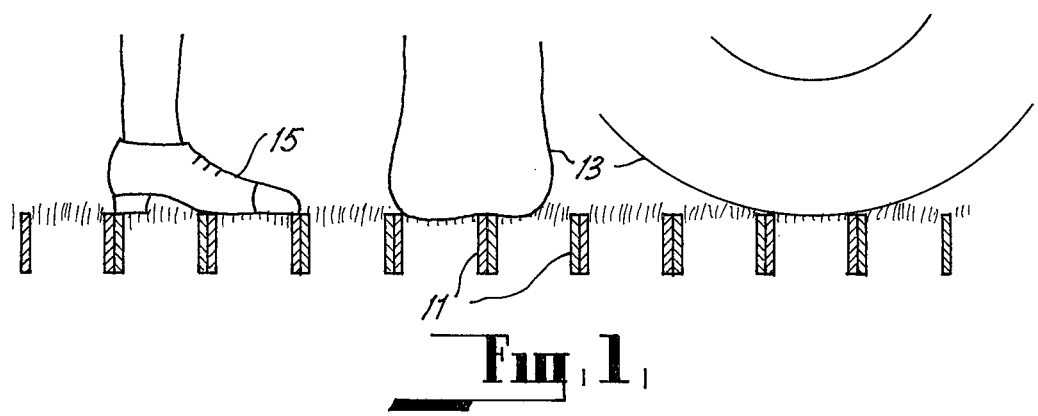

United States Patent [19]

Ritter

[11] 4,067,197

[45] Jan. 10, 1978

[54] MEANS FOR STABILIZING SOIL

[76] Inventor: Paul Ritter, 76 Brookton Highway, Kelmscott, Western Australia, Australia

[21] Appl. No.: 706,953

[22] Filed: July 20, 1976

[30] Foreign Application Priority Data

Nov. 26, 1975 Germany .............................. 2553086

[51] Int. Cl.² ................................................ E02D 3/12
[52] U.S. Cl. .......................................... 61/35; 404/35
[58] Field of Search ................. 61/35, 37, 38; 404/34, 404/35, 36

[56] References Cited

U.S. PATENT DOCUMENTS

| | | | |
|---|---|---|---|
| 1,071,091 | 8/1913 | Rogers | 61/38 |
| 1,905,176 | 4/1933 | Kieckhefer | 61/35 |
| 2,876,628 | 3/1959 | Dixon, Jr. | 61/38 |
| 3,597,928 | 8/1971 | Pilaar | 61/38 |
| 3,903,702 | 9/1975 | Appleton | 61/37 |

FOREIGN PATENT DOCUMENTS 676,764  8/1952  United Kingdom ..................... 61/37

*Primary Examiner*—Paul R. Gilliam
*Assistant Examiner*—Alex Grosz
*Attorney, Agent, or Firm*—Ulle C. Linton

[57] ABSTRACT

A means of stabilizing a surface area of soil comprising a plurality of rings formed of rigid material which is resistant to wear and corrosion, soil rings being fastened together in spaced relationship to each other, said means being intended to be laid over the surface area.

7 Claims, 6 Drawing Figures

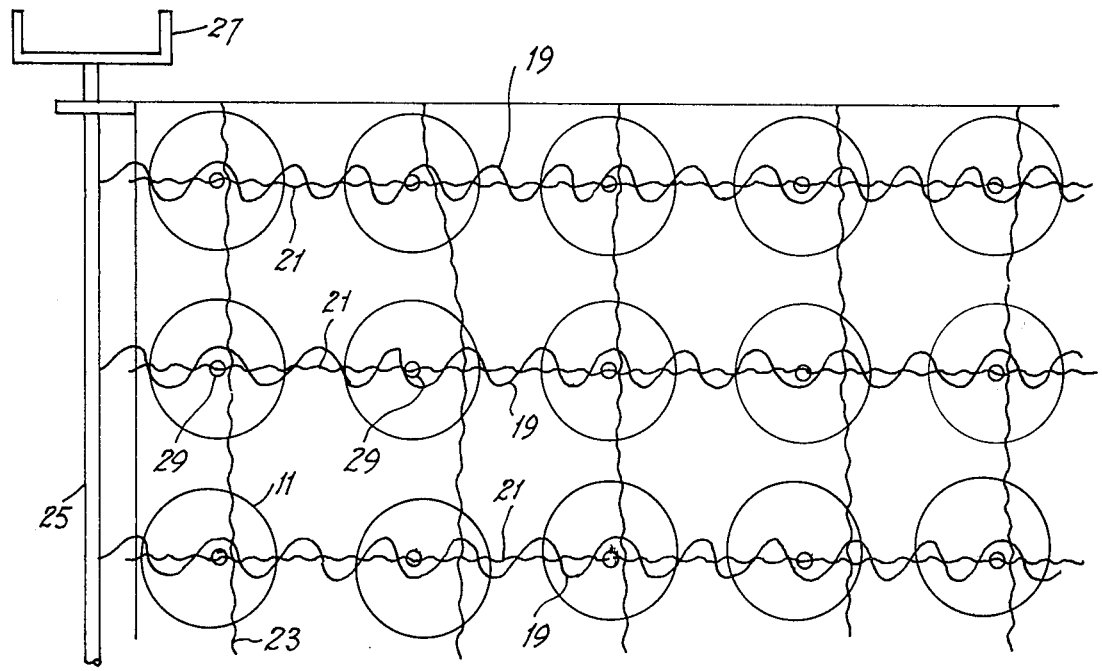
_Fig. 3A_
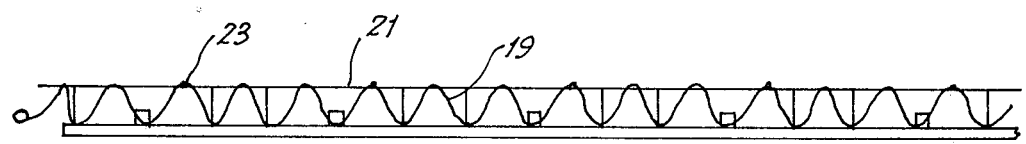
_Fig. 3B_
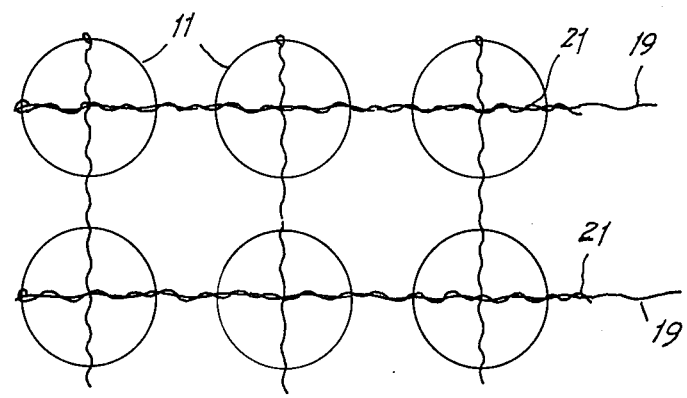
_Fig. 3C_

MEANS FOR STABILIZING SOIL

This invention relates to a means of treating the surface area of soil or grassed areas to stabilise the surface layer thereof and permit traffic thereof but also permitting the growth of grass, lawn or the like.

It is current practice in regions where there is a relatively high density to movement of persons and/or vehicles other than roads, highways and the like such as car parks, minor driveways, foot paths and the like to pave those areas with bitumen paving, concrete and/or slabs. It has been necessary to do such because where such traffic occurs on grassed or lawn areas, the condition of the surface soon deteriorates because of the destruction of the vegetation as a result of such wear. Experience has shown that very little traffic is required to destroy the lawn and/or grass to expose the soil underneath which would become unsuitable for traffic as a result.

The destruction of the vegetation as a result of such traffic is due to the compaction of the soil so reducing the aeration thereof and also the damage experienced by the roots as a result of such traffic.

It is an object of this invention to provide a surface which permits relatively heavy traffic compared to standard grassed areas, and also permits and promotes the growth of grass over the area and is capable of in itself stabilising the surface against erosive elements.

In one form the invention resides in a means of stabilising a surface area of soil comprising a plurality of rings formed of rigid material, which is resistant to wear and corrosion, said rings being interconnected together in spaced relationship to each other and being intended to be laid over the surface.

The invention will be more fully understood in the light of the following description of several embodiments.

Figure 2:
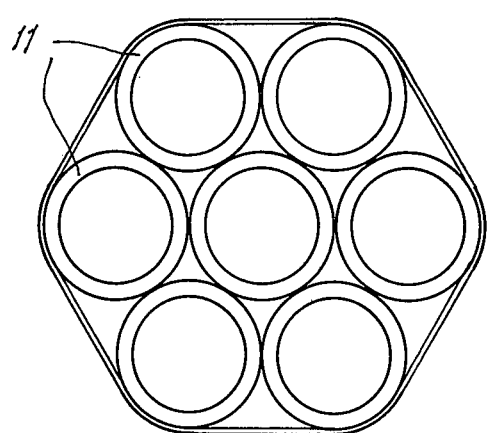

FIG. 1. illustrates the concept of the invention as applied to a surface;

FIG. 2 illustrates two patterns of rings showing one means of mounting the rings together; and FIG. 3A, B and C illustrates a second method of fixing the rings together and the apparatus used in relation thereto.

As seen in FIG. 1 the embodiment comprises a plurality of rings 11 of asbestos cement placed in a spaced relationship upon a substrate such as sand, loam, clay or the like. The rings may be forced into the substrate or may be placed on the surface and then the spaces between each and within each is partly filled with top dressing. If grass or the like ground cover is not already growing in the substrate such may be planted by any of the recognised means whether it be by runner seed, or a mixture of a binder and seed. As a result of the rings, any traffic over the surface such as vehicle wheels 13 or feet 15 or the like is unable to damage the plant roots or cause compaction of the soil. Therefore the embodiment of FIG. 1 facilitates the use of grassed areas as car parks, footpaths which have far more aesthetic appeal than bitumen or concrete paving.

A further use of the embodiment is to stabilise the surface of a substrate which is subject to severe erosion effects such as sand dunes. Placing the rings on the surface of an area of sand which is subjected to high wind conditions will stabilise the surface sufficient for ground cover to grow and complete the stabilisation.

Figure 4:
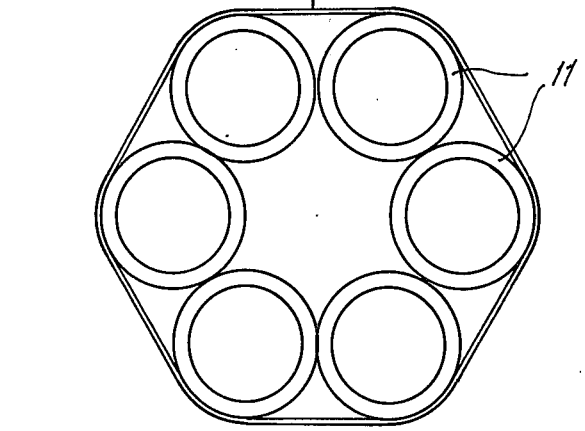

The rings may be fixed together in groups as seen in FIG. 2 or mounted together in a mat form as seen in FIGS. 3 and 4 which can be rolled or folded for storage and transportation and readily spread out for use. The means of attachment of FIG. 2 comprises placing the rings in a group and binding the rings together by means of strapping 17.

In laying the groups they are laid side by side in interlocking relationship such that they are relatively rigid to transverse displacement. An alternative fixing to that shown in FIG. 2 comprises fixing adjacent rings together by means of clips or staples. While the fixing of the rings by clips may produce a more stable group than that produced by use of a band 17 the fixing method is more time consuming and labour intensive.

An alternative method of fixing is shown in FIGS. 3A, B and C. The method comprises placing the rings together such that they remain in spaced relationship to each other during storage and transportation.

The method comprises laying out on a surface parallel to each other a plurality of coiled lengths of wire 19. The asbestos cement rings 11 are placed in a row upon each coiled length of wire 19 such that at least one coil or helix remains between adjacent rings 11. A further length of wire 21 is passed through each helix of each coiled length of wire such that it lies above the rings 19 and a second length of wire 23 is threaded in transverse relationship to the coiled lengths of wire such that it passes under the coiled length of wire 19 and above the ring 11. Once all of the rings and wires are in place the coiled lengths of wire are straightened by applying a tensioning force thereto. The tensioning force is applied by means of a rod 25 rotatably mounted at each side of the surface supporting the rings and transverse to the coiled lengths of wire. The rod 25 is provided at at least one end with a handle 27. The free ends of the coiled lengths of wire 19 are mounted to the adjacent rod 25 and rotation of the rod will straighten and tension the coiled lengths of wire 19. Once tensioned the coiled lengths of wire 19 are cut and twisted with the further length of wire 21. The mat of rings so formed as seen in FIG. 3C may be folded or rolled for storage and transportation and unrolled for use without any danger of displacement of the rings 11 during such. By crimping the further lengths of wire 21 and second lengths of wire 23 it is further ensured that such displacement cannot occur by the rings being engaged more firmly by the wires.

The surface supporting the rings 11 and wires 19, 21 and 23 during assembly of the mat may be provided with upstanding pegs 29 which are intended to maintain the spacing of the rings 11 during the tensioning of the coiled wire 19.

In addition it should be noticed that the means of tensioning the wires may take any form suitable.

A further alternative of mounting the rings is shown at FIG. 4 where the rings 11 are mounted to a sheet of matting 31. The matting 31 may take the form of hessian, polyethylene sheeting or any like sheet material. However it is preferable that the matting be permeable to water. The means of affixing the rings may be by stitching or by means of adhesive.

In use the sheets with the rings affixed thereto are laid out to cover the desired area and then a layer of soil may be spread over them.

In a preferred form the matting has applied to it a coating 33 of a seed mixture comprising seed and a binder and germination substrate prior to the laying of the matting in position. Such application may take the form of spraying or brushing or any other suitable means. When such a practice is utilised it is preferable the soil be placed over the laid rings in stages or the seed germinate and the plants increase in height, until the rings, have been covered.

It will be appreciated that once in place the interconnection between the rings 11 is of no further purpose unless at a later stage it is required to remove the rings, which is highly unlikely. However the interconnection between the rings facilitates more simpler handling and laying of the rings upon a surface.

I claim:

1. A means of providing a surface for receiving traffic such as a pathway, driveway or road surface and permitting the growth of grass thereon, said means comprising a plurality of rings of tubular configuration and of rigid material which is resistant to wear and corrosion, means fastening said rings together defining a mat like structure comprising a single layer of spaced rings, where the central longitudinal axes of said rings are perpendicular to the plane of the layer and said fastening means being capable of preventing the lateral displacement of said rings in said mat like structure whereby said mat like structure can be laid over the surface area.

2. A means as claimed in claim 1 wherein the rings are mounted in groups and adjacent rings of the group are clipped together.

3. A means as claimed in claim 1 wherein the rings are mounted in groups and are held together by a band extending around the periphery of the group in tensioned relationship thereto.

4. A means as claimed in claim 1 wherein the rings are arranged in a mat form and are held in spaced relationship to each other by a plurality of wires woven between the rings.

5. A means as claimed in claim 1 wherein the rings are mounted to a mat of sheet material.

6. A means as claimed in claim 5 wherein the sheet material is of a woven type and is water permeable.

7. A means as claimed in claim 5 wherein the sheet material has a seed mixture applied to it.

* * * * *